United States Patent [19]

Cupp

[11] 4,129,207
[45] Dec. 12, 1978

[54] PRODUCT ALIGNMENT MECHANISM

[75] Inventor: William A. Cupp, Sandston, Va.

[73] Assignee: AMF Incorporated, White Plains, N.Y.

[21] Appl. No.: 757,114

[22] Filed: Jan. 5, 1977

Related U.S. Application Data

[63] Continuation-in-part of Ser. No. 671,777, Mar. 30, 1976, abandoned.

[51] Int. Cl.² ............................................. B65G 47/12
[52] U.S. Cl. .................................... 198/445; 198/458; 198/462
[58] Field of Search ............... 198/427, 432, 443, 445, 198/446, 456, 458, 462, 539, 600, 836, 434

[56] References Cited

U.S. PATENT DOCUMENTS

| | | | |
|---|---|---|---|
| 2,237,345 | 4/1941 | Frentzel, Jr. et al. | 198/600 |
| 2,380,910 | 7/1945 | Newton | 198/458 |
| 2,555,602 | 6/1951 | Nutt | 198/462 |
| 2,856,060 | 10/1958 | Malnati | 198/458 |
| 2,941,650 | 6/1960 | Clinton | 198/446 |
| 3,355,003 | 11/1967 | Wayne et al. | 198/445 |
| 3,444,980 | 5/1969 | Wiseman | 198/445 |
| 3,590,977 | 7/1971 | Stanford | 198/817 |
| 3,767,027 | 10/1973 | Pund et al. | 198/453 |
| 3,788,497 | 1/1974 | Carlson | 198/432 |
| 3,809,207 | 5/1974 | Euverard | 198/458 |

FOREIGN PATENT DOCUMENTS

| | | | |
|---|---|---|---|
| 449963 | 7/1948 | Canada | 198/458 |
| 654692 | 12/1962 | Canada | 198/445 |
| 734410 | 8/1955 | United Kingdom | 198/458 |
| 773275 | 4/1975 | United Kingdom | 198/817 |

Primary Examiner—Evon C. Blunk
Assistant Examiner—Richard K. Thomson
Attorney, Agent, or Firm—George W. Price; Charles J. Worth

[57] ABSTRACT

An apparatus for aligning product being conveyed in a forward direction where a conveying element urges product to be re-distributed laterally for advancement to an adjacent accumulation plate to form interlocking hexagonal close pack clusters. Further distribution in the longitudinal and lateral directions takes place along a downwardly sloping contiguous conveyor having a series of flaring spacers until product is finally distributed in a desired fashion.

12 Claims, 5 Drawing Figures

PRODUCT ALIGNMENT MECHANISM

The present invention is a continuation-in-part of my previously filed application entitled Product Alignment Mechanism, U.S. Ser. No. 671,777 filed on Mar. 30, 1976, now abandoned.

The present invention is directed to an apparatus for aligning round, flat bottomed articles, such as baked hamburger rolls, which are initially conveyed in a random fashion. More particularly, the present apparatus is directed to a structure employing a series of conveyors acting upon product as received in a mis-aligned random fashion and at an unsteady rate of arrival, and orienting such product in a designated fashion for transfer to a packaging station.

The prior art has employed a number of techniques in attempting to align product being advanced to a packaging station. Experience indicates that such apparatus is in many respects more complicated, less efficient, more difficult to maintain and more expensive as compared to that of the present invention. For example, U.S. Pat. No. 1,351,018 discloses a stacking machine in which a knife cooperates with a plurality of spring fingers to lift the baked product off a conveyor and subsequently transfer the product to a grooved table. In another prior art patent, namely, U.S. Pat. No. 3,379,299, a conveyor for supplying parallel contacting rows of product is employed, and product is stacked on end into a plurality of single row conveyors for ultimate delivery as laterally spaced rows at a common level. U.S. Pat. No. 3,767,027 describes a plurality of guides which are adjustable groupwise proportionally in spacing for spreading the product spacing laterally. U.S. Pat. No. 3,355,033 describes a sequence of conveyors which separates a sheet of breakable material into individual places with predetermined spacing both laterally and horizontally. Lastly, in U.S. Pat. No. 3,828,914, an article unscrambler employs side rails that are vibrated to prevent articles being conveyed from adhering to one another.

None of the prior art accepts a random infeed of products and distributes them equally into a pre-determined number of longitudinal columns with a pre-defined spacing. Such columns and spacing can be varied at will.

From all of the aforementioned, it is readily apparent that the specific structure as defined hereinafter which receives randomly arriving and randomly distributed round, flat bottomed product and separates such product laterally, and distributes evenly in a controlled fashion, after an intermediate orientation in which alternate columns are caused to travel simultaneously, and likewise causing adjacent columns to move, is nowhere to be found in the prior art.

The main object of the present invention is to overcome the defects of the prior art.

Another object of the invention is to provide an adjustable conveying apparatus for orienting randomly fed product into a designed lateral distribution.

Still another object of the invention is to provide a plurality of horizontal and angular adjustable spaced members for assuring controlled and even lateral product distribution as product is being advanced in a forward direction.

A further object of the invention is to provide structure enabling product to be clustered in a hexagonal close packed configuration and so advanced in unison until selective separation on a row by row basis is attained.

The principle features of the present invention are directed to a product alignment apparatus employing a series of continuous conveyors integrally formed to act upon product advancing in a forward direction, and having, first conveying means for receiving product from a random source of supply, said first conveying means being formed of a continuously moving surface, such as a belt or a plurality of equally or divergingly spaced apart springs, elastic cords, etc. of suitable frictional interaction with the product, such as to cause the product to be urged forward onto a second means consisting of an accumulating member disposed in proximity to said first conveying means laying in a plane coincidental thereto, for receiving product advancing from said first conveying means; and having low frictional interaction with the product so that product slides easily over its surface; guide means disposed at the respective lateral portions of said first conveying means and said accumulating member, for defining the maximum lateral disposition of said product; and second slide conveying means in proximity to and disposed at angle with respect to said accumulating plate, said second conveying means being formed with a series of product orientators for receiving and urging product to travel in a downward and lateral direction in a predetermined pattern.

Other objects and advantages of the invention will be best understood with reference to the accompanying specification, claims and drawings.

IN THE DRAWINGS

Figure 1:
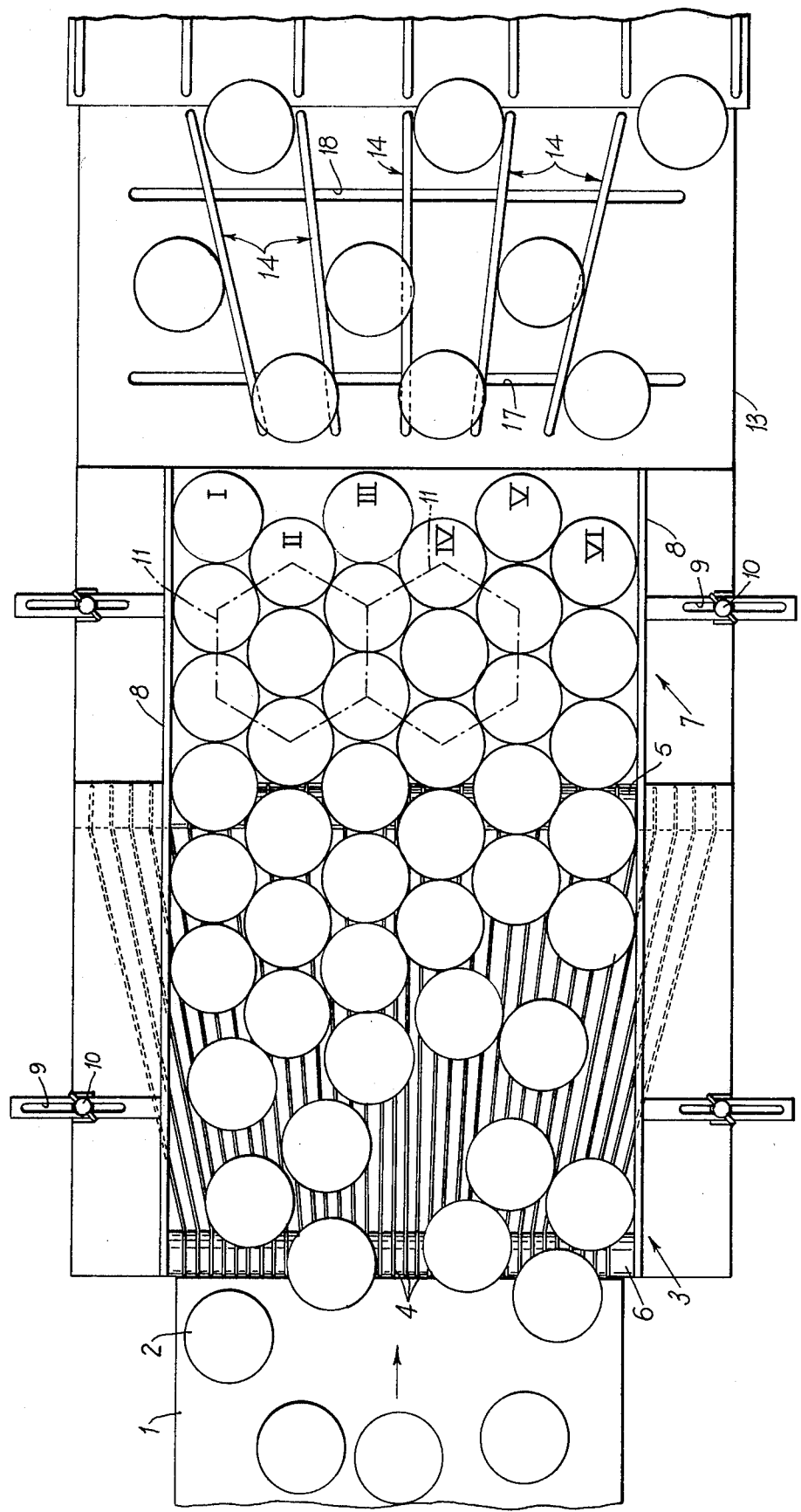
FIG. 1 is a plan view of the invention illustrating product being conveyed in the forward direction.
Figure 2:
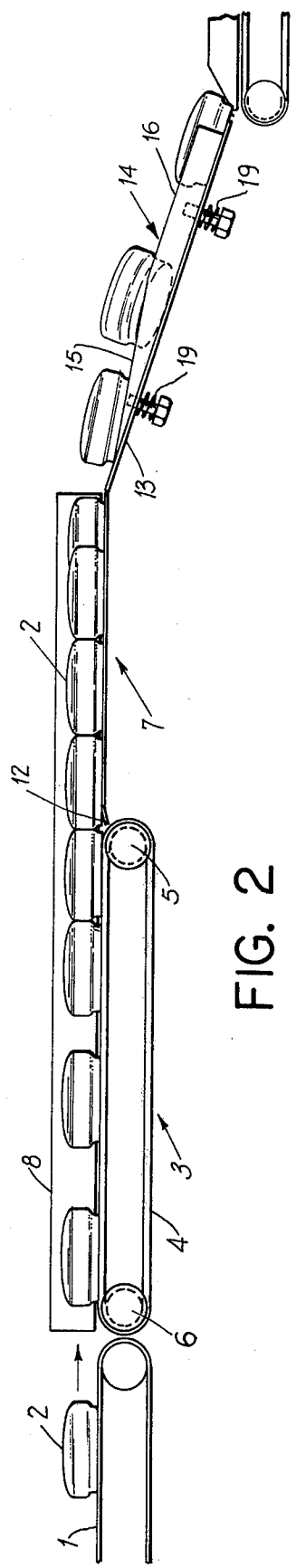
FIG. 2 is a profile view of FIG. 1.

As shown in FIG. 1, the inventive assembly comprises a number of conveying elements to be explained hereinafter, for receiving product from a source through a supply conveyor 1. For purposes of discussion and for illustrative purposes only, the product to be handled by the apparatus of the invention is hamburger buns 2. As the buns 2 are conveyed in a forward direction they proceed in random fashion along the supply conveyor 1 until they enter and travel upon the first conveyor 3 which is formed of, for an example, a plurality of spaced apart flaring members 4. Such members 4 can be, for example, constructed of individual helical springs or belts. The various elements 4 are mounted on a motor driven shaft through multi-grooved pulley 5 at one end and on an idler shaft 6 at the opposite end.

The first conveyor is operated at a suitable speed and the force exerted on the buns to urge then forward is sufficient to push them onto the accumulator plate but not so great as to impact onto the other buns on the accumulator plate and disrupt the hexagonal close packed pattern. The optimum speed of the conveyor is attained on a trial and error basis and varies with construction, i.e. flat belt or springs.

Once the buns 2 have been urged onto the first conveyor 3 such product proceeds and enters onto an accumulating plate 7 disposed in alignment with and adjacent to the first conveyor 3. The lead-in edge 12 of the accumulating plate 7 is recessed to enable smooth product flow. As the buns 2 enter on the plate 7, they are opposed in the tendency to move in a forward direction by the frictional resistance of the plate 7. As a result, buns 2 must be urged in a forward direction by such product flow exiting off of the first conveyor 3. At the interface of the spreading conveyor 3 and and accumulating plate 7 (see FIG. 1), product (buns 2) due to the frictional resistance to forward motion, is starting to back-up and move laterally to the limits of side guides 8, which guides extend for the combined length of the spreading conveyor 3 and accumulating plate 7. The lateral dimension between the side guides 8 establishes the criteria for the number of buns in each row. Side guides 8 can be adjusted across the width of the spreading conveyor 3 along a slot 9 and fixed in position by suitable fasteners, i.e., thumb screws 10.

As is generally well established, round objects such as buns, discs, cylinders, etc. when urged into close proximity to one another in a given plane when restrained by boundaries of the proper separation distance, but with freedom to move and rebound from one another in a lateral direction, will tend to assume a hexagonal close packed configuration; for example, as shown in FIG. 1, the array of buns 22 identified by the broken line 11 is intended to be in a hexagonal close pack configuration. Accordingly, the maximum width of the hexagonal close pack 11 is a function of the distance between side guides 8. The proper width of spacing of the guides is, by geometrical analysis equal to $[(N-1) \cos 30° + 1]$ times the product diameter D, where N is the desired number of products in two adjacent staggered rows. As a further characteristic of the hexagonal close pack condition, the adjacent hexagonal close pack arrays will tend to overlap one another, whereby rows of buns 2 being formed are aligned along lines 60° to the side guides 8. Such packing of adjacent buns 2 represents the optimum density of product as it is being conveyed in a forward direction.

In turn, the rate of travel of the first conveyor 3 is determined by frictional resistance to forward travel of the buns 2 on the accumulating plate 7. For example, the speed of first conveyor 3 must be sufficiently great enough to overcome the frictional resistance or else the product will backup from the spreading conveyor 3 onto the supply conveyor 1. If the speed of the first conveyor 3 is too fast, the product array on the accumulating plate 7 will not have an opportunity to form into a hexagonal close pack with the result that the maximum intended number of columns for a given side guide width 8 will not materialize and irregular feeding patterns will form.

The length of the accumulator plate must be long enough so that product arriving from the supply conveyor to one side or the other of the first conveyor and thence to the accumulator plate will have the opportunity to slide by being advanced through subsequently arriving buns for establishing the close packed pattern. This length in one application is approximately two feet, but it will depend on the nature of the product, the first conveyor surface and the accumulator surface.

A unique feature of this invention and the reaction of the hexagonal close packed product distribution is that as subsequent product arrives randomly or to one side or the other of the center of the accumulator plate, the close packed grouping will tend to be urged forward as a group in unison, because of the interlocking of the columns of products, rather than one longitudinal column of product slipping past another, resulting in the uniform distribution of product. It is this feature which causes even distribution of product feeding into subsequent columns of the predetermined pattern.

A separator slide 13 disposed at the end of the accumulating plate 7 provides a definite lateral separation to the buns 2 exiting the accumulating plate 7 and descending by gravity on slide 13. The separator 13 slopes downwardly and away from the horizontal axis of the accumulating plate 7. In operation, separator slide 13 serves to longitudinally separate each bun 2 from one another during the forward travel. In effect, hexagonal close pack break-up occurs and each pack loses its identity during travel on slide 13. The lead buns of each of columns I, III, V (FIG. 1) will simultaneously tend to enter the slide 13 and the lead buns from columns II, IV, VI will follow. Those rows at the front and adjacent to the slide 13, will be first to break-away from hexagonal close pack, thus, forward travel of the buns 2 on the slide 13 is staggered.

In order to assure lateral separation of product proceeding downwardly, a plurality of separator vanes 14 are positioned substantially along the length of slide 13.

Figure 3C:
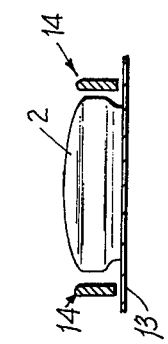
FIG. 3c is a partial cross sectional view of the orientation guide with product at the point of exit.
Figure 3B:
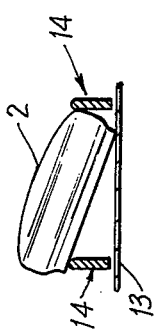
FIG. 3b is a partial cross sectional view of the orientation guide with product traveling in a forward direction at a second point in time.
Figure 3A:
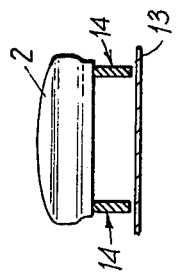
FIG. 3a is a partial cross sectional view of the orientation guide with product traveling in a forward direction at a first point in time.

For a given number of columns, it is necessary to have one less vane 14. These vanes are disposed laterally in a manner in which the distance between adjacent vanes 14 becomes progressively wider as they proceed from the upper to the lower portion of the slide 13. At the upper portion along slide 13 the bun 2 is engaged by one or two adjacent vanes 14. If two vanes are engaged in a manner shown in FIG. 3a, the bun 2 tends to be guided and ride upon the vanes 14. Further downstream, as the distance between adjacent vanes becomes greater the buns 2 tend to fall and lodge themselves into a space between the vanes 14 (see FIG. 3c). If the bun is engaged by only one vane, the engaged edge is lifted up at an angle from the surface of the slide. As the bun travels down the slide it rotates and slides laterally until it falls into the channel between vanes.

The vanes 14 are each tapered at surface 15 to enable the forward travel of product to take place without a substantial loss of momentum and then gradually meets another surface 16 which is parallel to the slide 13. The vanes 14 are of a sufficient height to insure the ability to urge the product laterally, but not too high to impede forward motion of product, i.e., tipping and causing jam-ups or product rolling.

The slide 13 is provided with two spaced apart slots 17, 18 which enable the vanes 14 to be positioned across the width of slide 13 at designated distances between adjacent vanes 14 and held in place by compressed spring 19 at the undersurface of slide 13. After traversing slide 13, the buns 2 exit in successive parallel columns with an equal number of buns in each.

While the invention has been described in connection with a preferred embodiment, it will be obvious to those skilled in the art that various modifications can be made therein within the scope of the invention.

What I claim is:

1. A product alignment apparatus employing a series of continuous conveyors integrally formed to act upon product advancing in a forward direction, including: first conveying means for receiving product at random from a source of supply, said first conveying means being formed of a plurality of spaced apart separating members for lateral distribution of product and simultaneously urging product forward at a predetermined speed; accumulating means disposed in proximity to said first conveying means laying in a plane coincidental thereto, for receiving product advancing from said first conveying means; guide means disposed at the respective lateral portions of said first conveying means and said accumulating means, for defining the maximum lateral travel of said product; and with said first conveying and accumulating means causing product to assume a tight pack hexagonal pattern; and second conveying means, being in proximity to and disposed at an angle with respect to said accumulating means, and being formed with a series of product orientators for receiving and urging product to travel in a downward and lateral direction in a predefined pattern of side by side longitudinal columns.

2. An apparatus as claimed in claim 1, and: said guide means being laterally adjustable for defining the effective operating width of said first conveying means and said accumulating means such that a hexagonal close packed grouping is formed.

3. An apparatus as claimed in claim 1, and: said first conveying means being adapted to urge said product in a forward direction and at a rate of travel causing product conveyed therefrom to form a cluster in a hexagonal close packed pattern.

4. An apparatus as claimed in claim 1, and: said accumulating means being adapted to provide frictional resistance to the forward travel of said product for cooperating with said separating means, to urge said advancing product to interlock in a hexagonal close packed pattern.

5. An apparatus as claimed in claim 1, and: said product being advanced onto said accumulating means being clustered in rows oriented 60° to the horizontal axis of said first conveying means.

6. An apparatus as claimed in claim 1, and said product being urged onto the accumulator means by said first conveyor means urges said product to move along the accumulator means in unison without slippage between adjacent columns.

7. An apparatus as claimed in claim 1, and: said second conveying means being provided with a plurality of spaced apart separating members disposed along the width of said second conveying means.

8. An apparatus as claimed in claim 7, and: said separating members being defined by a tapered upper section extending into a contiguous downwardly sloping portion extending in a plane parallel to said second conveying means.

9. An apparatus as claimed in claim 7, and: said separating members each being adjustably positioned from one another to form a space therebetween sufficient to enable free travel of product along said second conveying means 10. An apparatus as claimed in claim 7, and: said separating members each being spaced with respect to one another, to progressively form an increasing width therebetween along the line of travel of said second conveying means for product travel.

11. An apparatus as claimed in claim 1, and: alternate rows of product formed on said accumulating member separately travel in a downward direction along said second conveying means.

12. An apparatus as claimed in claim 1, and: a plurality of spaced product separation vanes being disposed in progressively wider apart relation along the line of travel of said second conveying means, whereby product initially traveling downwardly along said second conveying means being urged to travel on top of said separator vanes and as the product travels downwardly, said separator vane causes the product to rotate and slide down into the channel formed between vanes.

* * * * *